Jan. 13, 1970   W. S. POWERS, JR   3,489,275
PRESSURE PROVER FOR FRANGIBLE CONTAINERS
Filed Jan. 29, 1968   8 Sheets-Sheet 1

INVENTOR
WHITNEY S. POWERS, JR.
BY *Seidel & Gonda*

ATTORNEYS.

INVENTOR
WHITNEY S. POWERS, JR.

BY Seidel & Gonda

ATTORNEYS.

Jan. 13, 1970   W. S. POWERS, JR   3,489,275
PRESSURE PROVER FOR FRANGIBLE CONTAINERS
Filed Jan. 29, 1968                               8 Sheets-Sheet 5

INVENTOR
WHITNEY S. POWERS, JR.
BY Seidel & Gonda
ATTORNEYS.

Jan. 13, 1970 W. S. POWERS, JR 3,489,275
PRESSURE PROVER FOR FRANGIBLE CONTAINERS
Filed Jan. 29, 1968 8 Sheets-Sheet 7

INVENTOR
WHITNEY S. POWERS, JR.

BY *Seed & Gouda*

ATTORNEYS.

Jan. 13, 1970    W. S. POWERS, JR    3,489,275
PRESSURE PROVER FOR FRANGIBLE CONTAINERS
Filed Jan. 29, 1968    8 Sheets-Sheet 8

INVENTOR
WHITNEY S. POWERS, JR.
BY
ATTORNEYS.

United States Patent Office 3,489,275
Patented Jan. 13, 1970

3,489,275
PRESSURE PROVER FOR FRANGIBLE CONTAINERS
Whitney S. Powers, Jr., Pine City, N.Y., assignor to Power Manufacturing Inc., Elmira, N.Y., a corporation of New York
Filed Jan. 29, 1968, Ser. No. 701,311
Int. Cl. B07c 9/00; B07b 9/00; G01m 3/00
U.S. Cl. 209—72                           10 Claims

ABSTRACT OF THE DISCLOSURE

Bottles to be tested for malformation and for resistance to internal pressure are conveyed at constant speed through a test area where a synchronously traversed plunger injects air under metered pressure. A turret, revolving in timed relation, provides moving pockets confining the bottles under test, to prevent scattering if it explodes. When a bottle breaks, the cullet is removed from the conveyor by an ejector located beyond the test area. The plunger and turret are chain driven from a common motor, which is stopped by a circuit breaker responsive to abnormal chain tension.

---

The testing device of the present invention is designed to be in line with a lehr and pressure test bottles while the bottles are on the conveyor which removes them from the lehr. The present invention is designed to operate at speeds up to 180 bottles per minute while pressure testing each bottle on the conveyor at pressures up to 60 p.s.i. To my knowledge, an in-line testing device for 100% testing of bottles without removing them from the conveyor has never been done before. The advantages are high speed, elimination of safety hazards, reliability, less handling of the bottles, and elimination of accessory equipment such as star wheels and rotating tables which take up floor space.

It is an object of the present invention to provide a novel device for testing the ability of frangible containers such as glass bottles to withstand a predetermined internal pressure, while the containers are moving at uniform speed on a conveyor, in which the bottle being tested is effectively isolated so that the products of explosion of a defective bottle are prevented from striking the adjacent bottles.

It is another object to provide such a device incorporating means which is operative on bursting or shattering of a bottle, to remove the broken pieces from the conveyor, by an ejecting device, after the cullet has been conveyed beyond the test area.

It is another object to provide such a device incorporating overload trip mechanism to interrupt the operation of the device in case of obstruction by flying fragments of cullet or the like.

Further objects and advantages will be apparent from the following description, taken in conjunction with the accompanying drawing in which.

Figure 1:
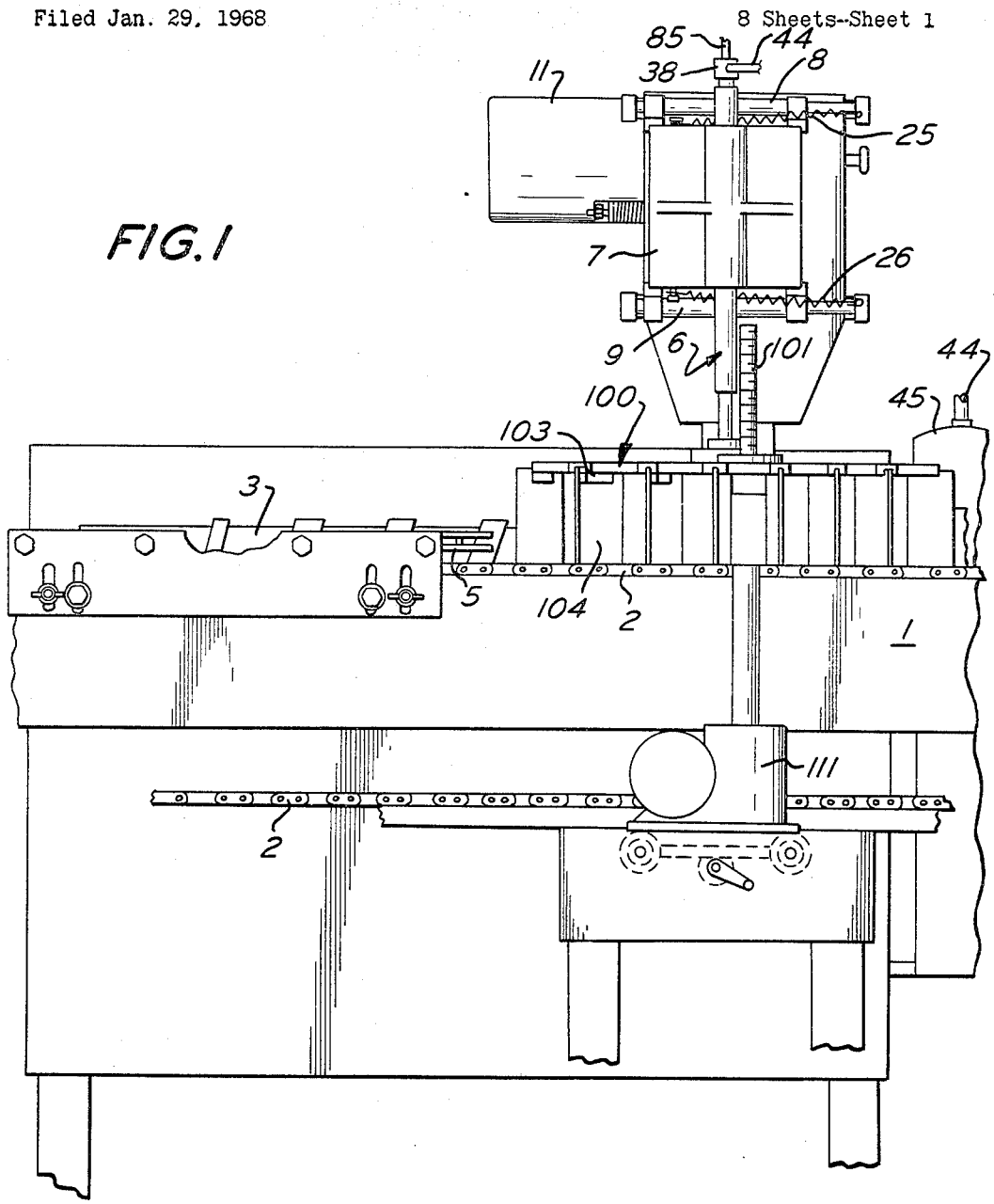
FIGURE 1 is a front elevation of the device with the enclosing shield removed to show the operating parts.
Figure 3:
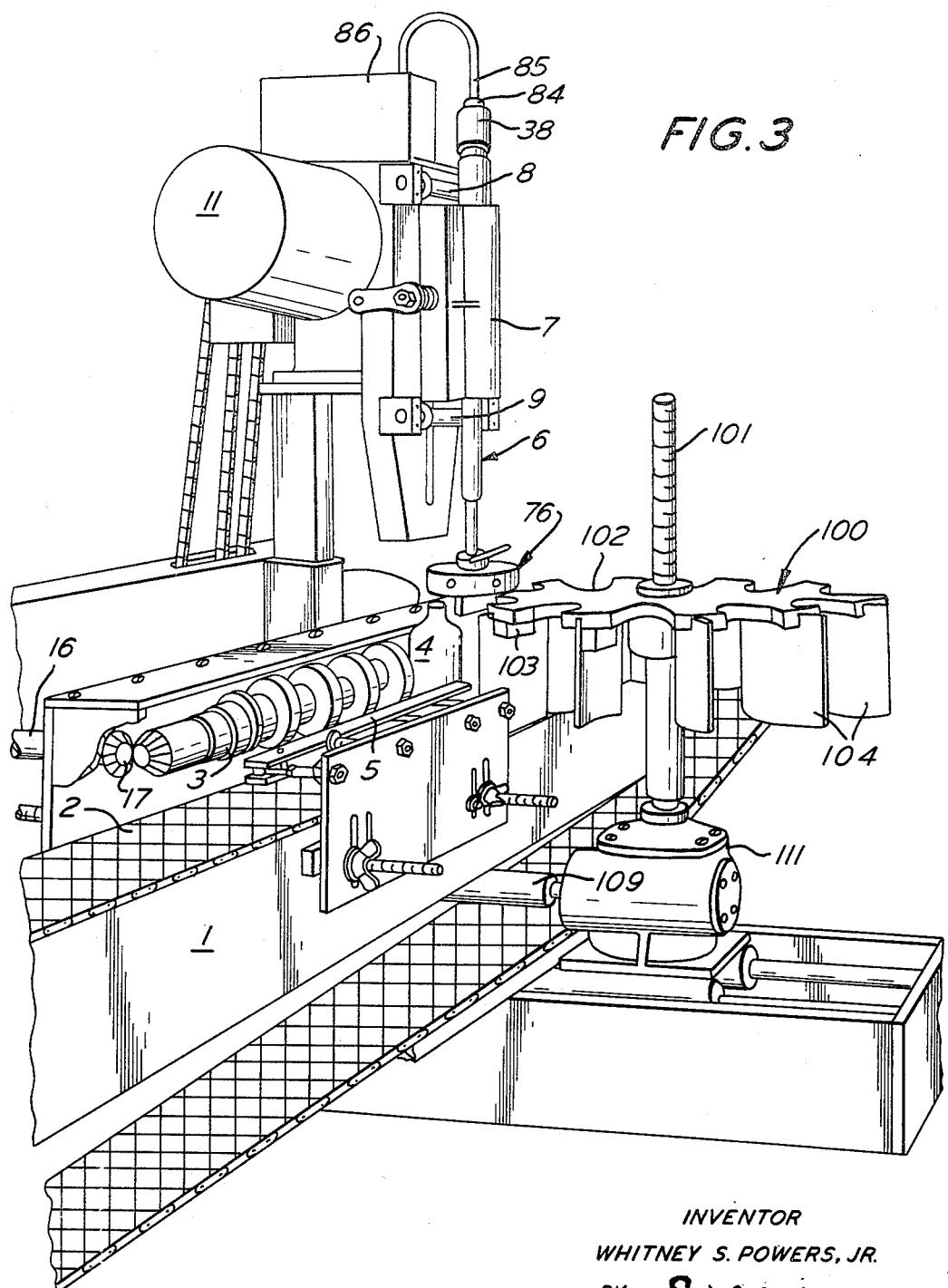
FIGURE 3 is a side perspective view showing the mechanism for conveying the bottles into test position.

In FIGURES 1 and 3 of the drawing there is shown a frame 1 on which a metallic belt conveyor 2 is mounted and moved in any suitable manner at a constant linear speed from left to right in FIGURE 1.

The containers to be tested are brought by the conveyor 2 into engagement with a rotating worm shaft 3, the convolutions of which receive and feed the containers such as the bottle 4 toward the testing area in timed relation to the testing mechanism to be described. A spring-pressed guide rail 5 (FIGURE 3) serves to hold the containers snugly against the worm shaft 3.

A test plunger assembly indicated generally by numeral 6 is mounted for vertical reciprocation in a carriage 7 which is slidably mounted on horizontal bearing bars 8 and 9.

Figure 2:
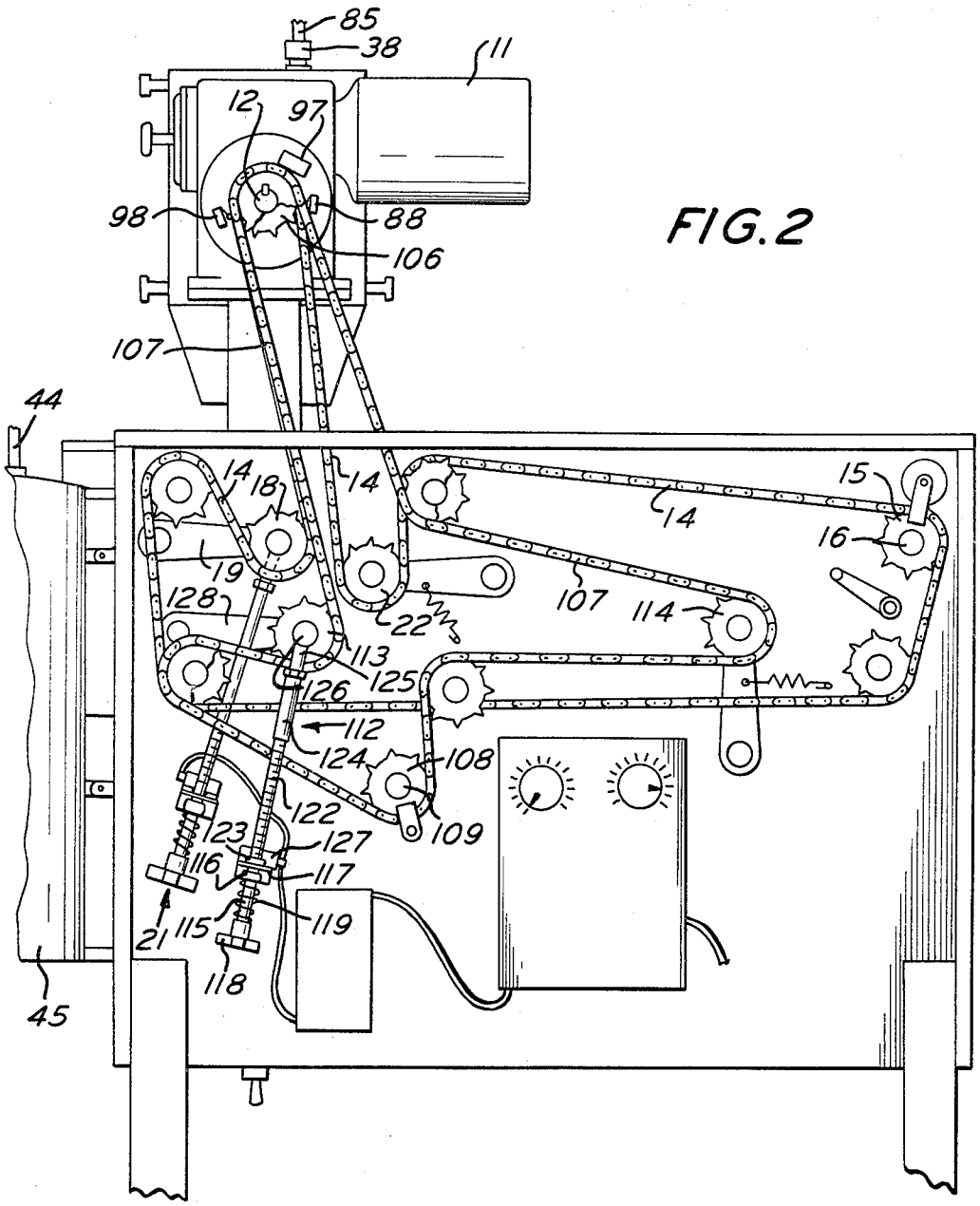
FIGURE 2 is a rear elevation, also with the enclosure of the driving mechanism removed.
Figure 5:
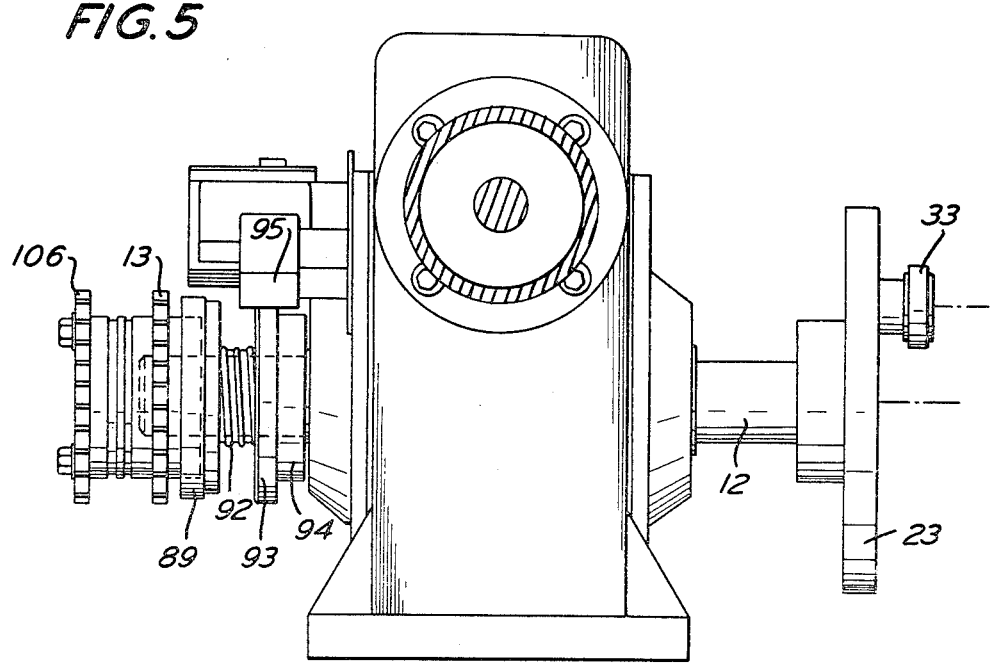
FIGURE 5 is an enlarged detail view in elevation of the motor and power shaft with the driving and control mechanism mounted thereon.

A common driving means for rotating the traversing worm shaft 3 and for reciprocating the carriage 7 and test plunger assembly 6 is provided comprising a motor 11 mounted on the frame 1 and connected by suitable reduction gearing to a power shaft 12 (FIGURES 2 and 5).

The means for rotating the worm shaft 3 comprises a sprocket 13 fixedly mounted on the power shaft and connected by a chain 14 to a sprocket 15 fixed on a cross shaft 16 which drives the worm shaft 3 through mitre gearing 17 (FIGURE 3). In order to adjust the timing of the worm shaft 3, the chain 14 is caused to form a loop around an idler sprocket 18 mounted on a pivoted arm 19 and movable by an adjusting link assembly indicated generally by numeral 21. The slack in the chain caused by varying the loop around the idler sprocket 18 is taken up by a spring mounted tension idler sprocket 22.

Figure 4:
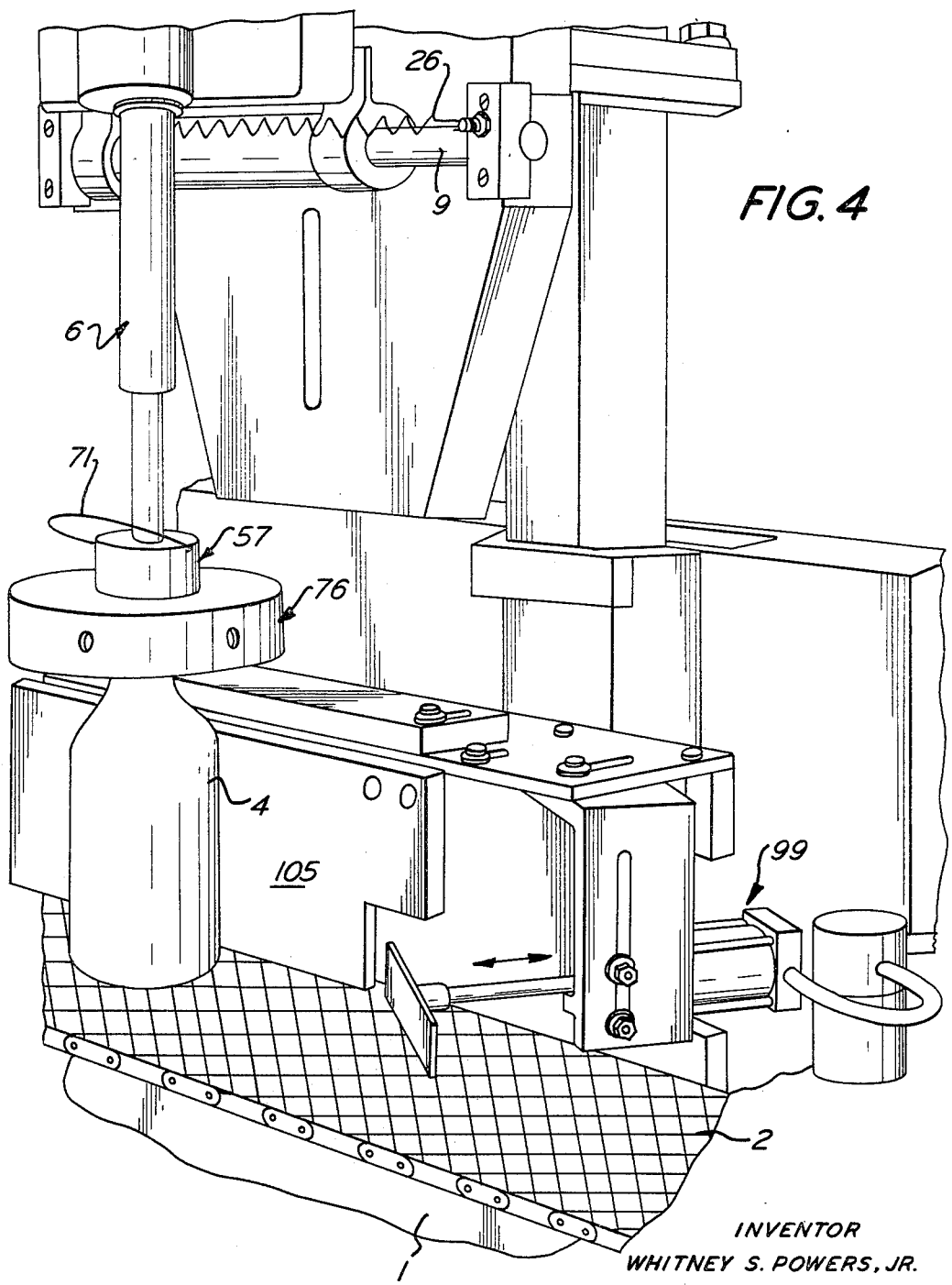
FIGURE 4 is a perspective view of the exit side of the device, the guard-carrying turret being withdrawn to show the ejector mechanism.

The means for actuating the sliding carriage 7 and test plunger assembly 6 comprises a radial cam plate 23 (FIGURE 5) fixedly mounted on the power shaft 12 in position to engage a roller 24 (FIGURES 7 and 8) mounted on the carriage 7. The carriage 7 is drawn toward its down-stream position with respect to the conveyor belt 2 by means of tension springs 25 and 26 (FIGURES 1 and 4) anchored to the frame 1, whereby the roller 24 is held in engagement with the periphery of the cam plate 23. The lobe of the cam is so designed that during the down-stream movement of the carriage 7, equal arcs of rotation of the cam plate 23 permit equal linear displacement of the carriage 7.

The test plunger assembly 6 comprises a tubular shaft member 27 (FIGURES 7 and 8) which is mounted for vertical sliding movement in bearings 28 and 29 in the carriage 7 and has fixed thereon a yoke member 31 formed with a horizontal channel 32 slidably receiving a roller 33 (FIGURE 5) mounted eccentrically on the face of the cam plate 23. The roller 33 is so positioned on the cam plate 23 that during the down-stream stroke of the carriage 7, the plunger assembly 6 is moved down to its operative position and then retracted to idle position.

The mechanism for actuating the carriage 7 and plunger assembly 6 is the same as originally disclosed and described in more detail in applicant's prior application Ser. No. 519,991, filed Jan. 11, 1966, now Patent No. 3,387,704. The disclosure therein is incorporated by reference.

Figure 7:
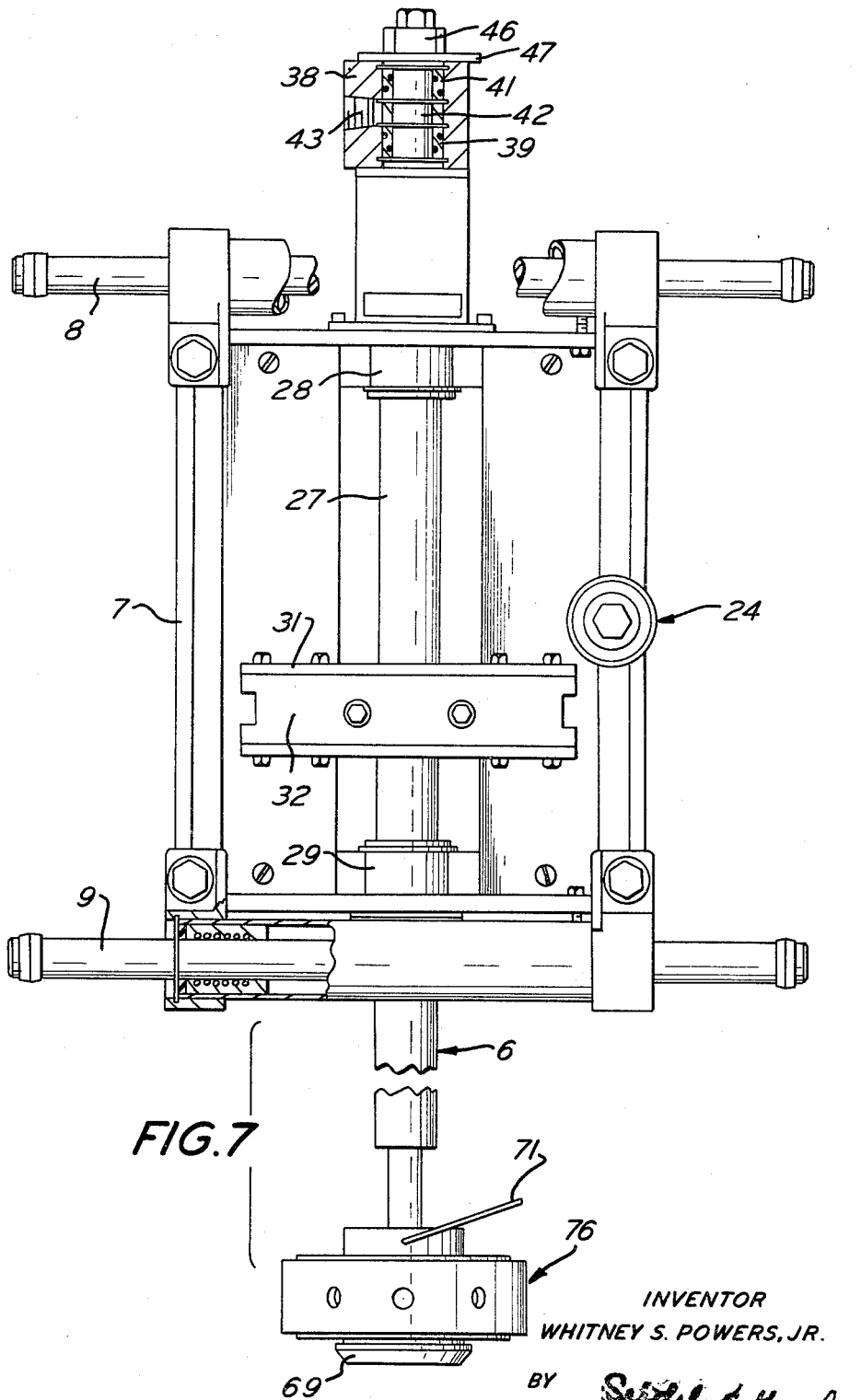
FIGURE 7 is an enlarged face view of the pressure conducting plunger assembly in its supporting carriage.
Figure 8:
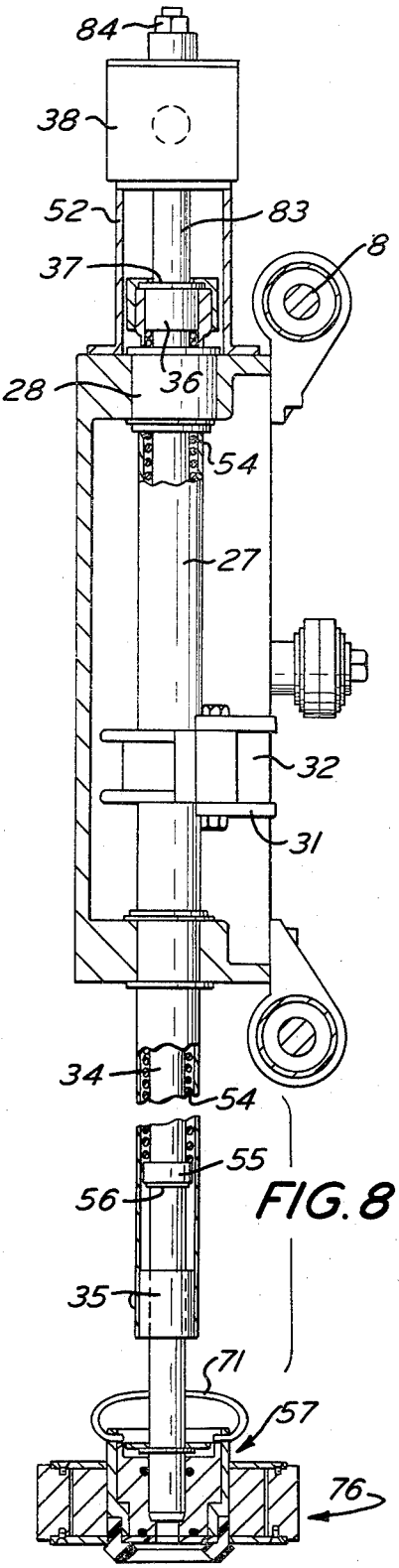
FIGURE 8 is a side view of the same partly broken away and in section.

FIGURES 7 and 8 of the drawing show the internal structure of the plunger assembly 6 and the means whereby it pressure-tests the bottles. As there shown, a pressure pipe or quill 34 is mounted for vertical sliding movement in a bushing 35 fixed in the lower end of the tubular shaft 27 and a flanged bushing 36 retained in the upper end of said shaft 27 by a cap member 37 having a bayonet attachment thereto.

The upper end of the pressure pipe 34 extends out of the shaft 27, and a sleeve valve member 38 is slidably mounted thereon by means of spaced bushings 39 and 41. The space 42 between said bushings has a port 43 which is threaded to receive the terminal fitting of a flexible hose 44 (FIGURE 1) connected to a regulated source of air pressure 45. Pressurized air at 40 to 60 p.s.i. is suitable. The bushings 39 and 41 are provided with interior and exterior packing in the form of "O rings" to prevent the loss of air pressure from the interior of the sleeve valve member 38.

A retaining member 46 having a radial flange or plate 47 is fixedly mounted in any suitable manner on the upper end of the pressure pipe 34. See FIGURE 9. The sleeve valve member 38 is formed with a pair of diametrically located axially-extending openings 48 in which compression springs 49 are seated and bear against the underside of the flange 47 to thereby urge said sleeve into engagement with a rubber stop collar 51 slidably mounted on the pressure pipe 34. A tubular abutment member 52, fixedly mounted on the top of the carriage 7 as by means of cap screws 53, provides a seat for the stop collar 51 to thereby limit the downward movement of the sleeve valve member 38, and consequently of the pressure pipe 34.

Figure 9:
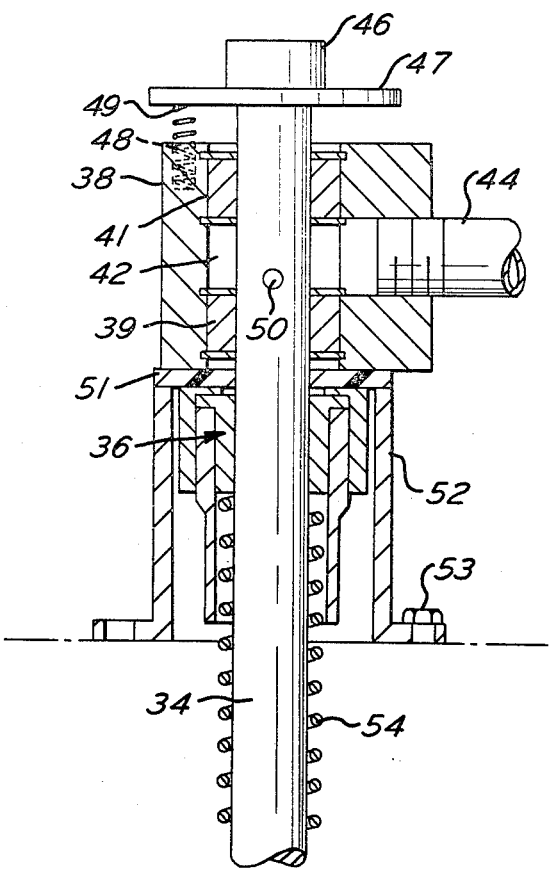
FIGURE 9 is an enlarged cross-section of the upper portion of the plunger assembly showing the sleeve valve mechanism in pressure admitting position.

The pressure pipe 34 has a plurality of ports 50 so located that when the retaining member 46 is in contact with the sleeve valve member 38, the ports are closed by the bushing 39. When, however, the pressure pipe is displaced upwardly with respect to said sleeve valve member 38, as shown in FIGURE 9, the ports are uncovered and admit the compressed air from the space 42 into the pressure pipe 34.

A compression spring 54 is located in the tubular shaft 27 surrounding the pressure pipe 34, bearing at its upper end against the bushing 36, and at its lower end on a thrust collar 55 retained on the pressure pipe by a lock ring 56. Said spring thus urges the pressure pipe downwardly with respect to the shaft 27, and normally holds the retaining member 46 in contact with the sleeve valve member 38, with the ports 50 closed.

Figure 10:
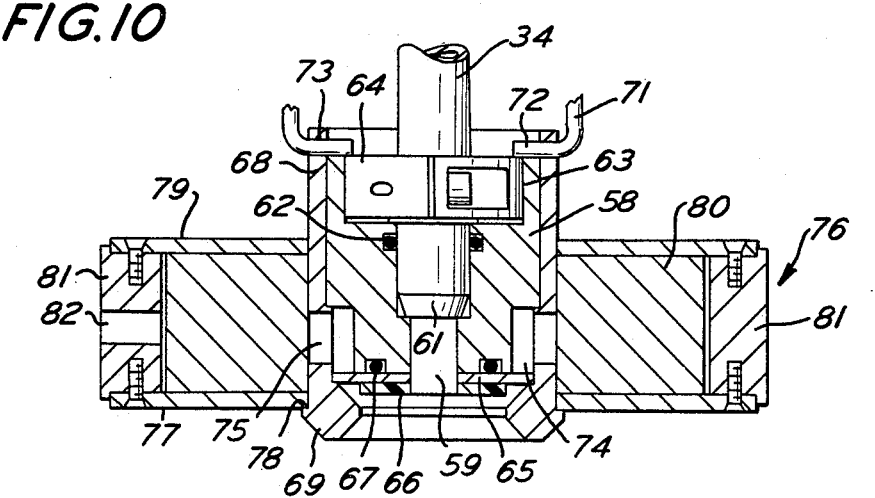
FIGURE 10 is an enlarged cross-section of the lower portion of the plunger assembly showing the muffler head and nozzle assembly.

A detachable muffler head and nozzle assembly indicated generally by numeral 57 is mounted on the lower end of the pressure pipe 34 for connection to the bottles to be tested. As shown in FIGURE 10, a pilot and nozzle member 58 is formed with a passage 59 therethrough which is enlarged to form a cylindrical recess 61 for reception of the end of the pressure pipe 34. An "O-ring" 62 is mounted in the recess 61 to pack the joint. A further enlargement 63 of the passage is formed to receive a split collar 64 fixedly mounted on the pressure pipe 34 and serving to transmit downward thrust from said pipe to the nozzle. A thrust plate ring or spider 65 having an annular pad 66 of elastically deformable material fixed on its lower face engages the flat lower face of the nozzle member 58, which is recessed for reception of a packing ring 67.

A bottle guide sleeve 68 is formed to snugly receive the nozzle member 58 and is provided at its lower end with an inwardly tapered annular shoulder 69, forming a seat for the spider thrust plate 65, and a guide for centering on the pad 66 the mouth of the bottle being tested.

Means for detachably retaining the nozzle assembly 57 on the pressure pipe 34 is provided in the form of a caliper spring member 71 having tines with inwardly bent tips 72 traversing openings 73 near the upper end of the guide sleeve 68, and resting on top of the split collar 64. The lower part of the nozzle member 58 is reduced in diameter to form an annular space 74 which is open downwardly through the legs of the spider thrust plate 65. The guide sleeve 68 is provided with a plurality of exhaust ports 75 communicating with the space 74 whereby at the termination of the test, as the pad 66 is lifted from the mouth of the bottle, the air compressed in the bottle can escape to the atmosphere.

In order to reduce the noise of this exhaust, and at the same time to form a guard preventing pieces of glass from an exploding bottle from being discharged upwardly, a muffler and baffle assembly 76 is mounted on the guide sleeve 68 in position to cover the ports 75. This assembly comprises a lower plate 77 seated on an exterior shoulder 78 of the guide sleeve, an upper plate 79, and a spacing ring 81 having peripheral ports 82. The space between the plates 77, 79 is filled with suitable sound-deadening material 80 such as glass wool to muffle the exhaust from said ports.

Figure 6:
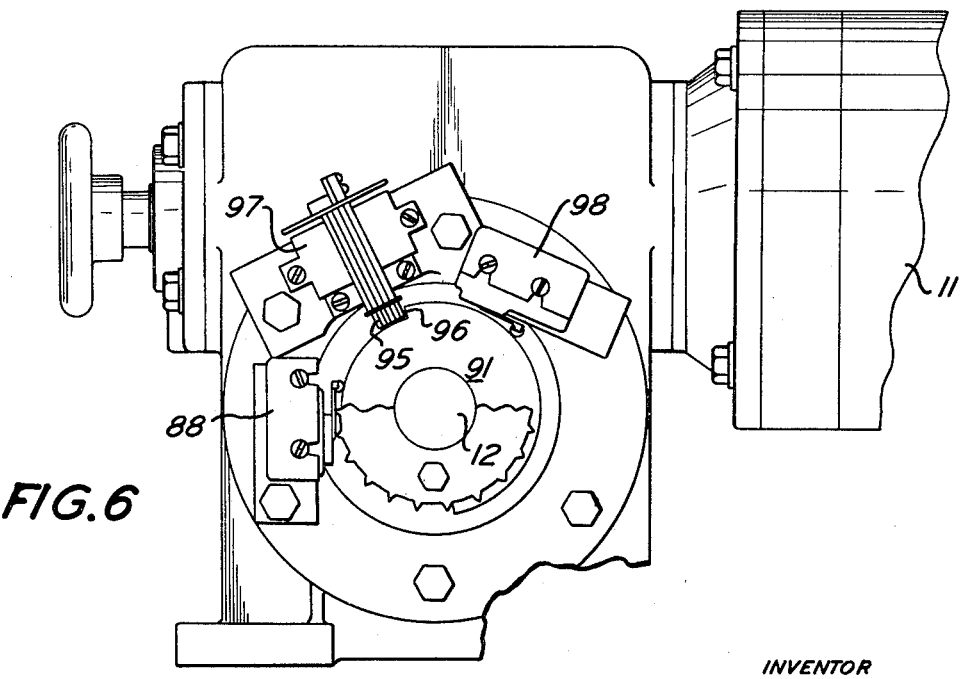
FIGURE 6 is a side view of the same.
Figure 11:
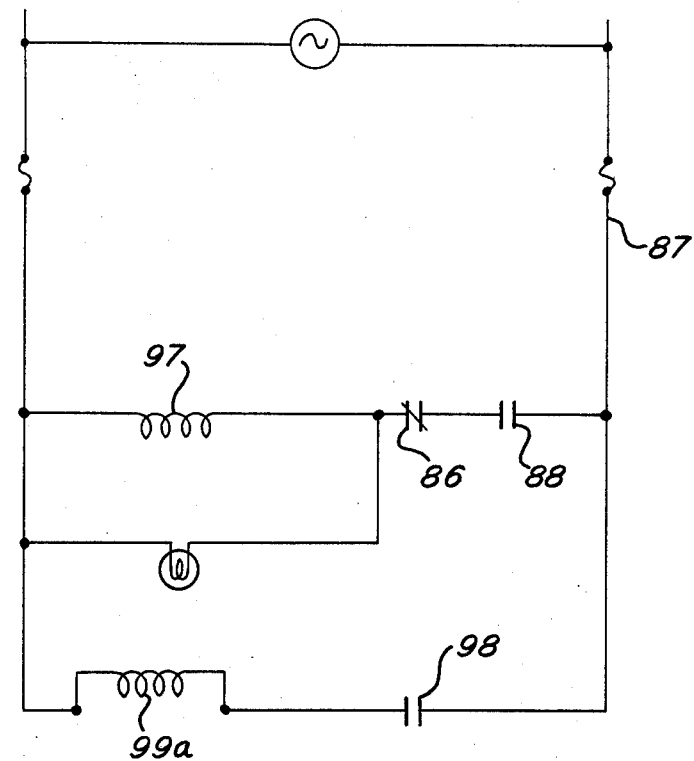
FIGURE 11 is a wiring diagram of the electrical system.

Means are provided for removing the cullet from the conveyor when a bottle fails under test, without interfering with the procession of sound bottles. For this purpose, a small tube 83 (FIGURE 8) is located in the pressure pipe 34, extending from its lower end up through the retaining member 46 where it is coupled to a hose fitting 84. A flexible hose 85 (FIGURE 3) connects this fitting to a pressure switch 86 (FIGURES 3 and 11) having normally closed contacts which are opened by the test pressure at the mouth of the bottle under test. One terminal of the pressure switch is connected to one conductor 87 of a source of power, through an interrogate switch 88 having normally open contacts. As shown in FIGURES 2 and 6, the interrogate switch is mounted on the reduction gear housing adjacent the power shaft 12 in position to be operated by an interrogate cam 89 (FIGURE 5). This cam is fixedly mounted on said shaft in such angular relation to the position of the plunger-operating roller 33 on the cam plate 23 that the interrogate switch 88 is closed shortly after the full test pressure has been injected into the bottle.

An eject cam 91 (FIGURES 5 and 6) is rotatably mounted on the power shaft 12 and frictionally connected to rotate therewith by means of a compression spring 92 and thrust washer 93 which press said cam against a collar 94 fixed on the shaft. A latch 95 normally engages a shoulder 96 on the periphery of the eject cam 91 to thereby hold it from rotation. A solenoid 97 (FIGURES 6 and 11) which is connected between the pressure switch 86 and the power source, is arranged to withdraw the latch 95 and allow the eject cam 91 to rotate with the power shaft 12 when the solenoid is energized. Solenoid 97 is energized when both the pressure switch 86 and the interrogate switch 88 are closed.

An ejector switch 98 is mounted on the gear housing in position to be closed by the eject cam 91 after it has been released and moved through a major arc of rotation with the power shaft. Closure of the ejector switch 98 is arranged to actuate an air operated ejector 99 (FIGURE 4) located beside the conveyor beyond the test area. Ejector 99 terminates in a pusher plate and, when energized, pushes off from the conveyor any cullet left after a bottle 4 under test has exploded. Ejector 99 is operated by solenoid coil 99a, see FIGURE 11.

Means are provided for so isolating the bottles 4 under test that if one fails, the explosion will be confined to a pocket or chamber which moves with the bottle and prevents the fragments of glass from injuring adjacent bottles. For this purpose a horizontal turret 100 (FIGURES 1 and 3) is mounted for rotation on a vertical shaft 101 in front of the test area in position to extend over the location of the bottle 4 being tested. The periphery of the turret 100 is recessed as indicated at 102 to provide clearance for the neck of the bottle and for the shoulder 69 on the lower end of the guide sleeve 68.

Mounting blocks 103 having horizontally curved vertical faces are fixedly attached to the underside of the turret 100 between the recesses 102, and curved guard flaps or panels 104 are mounted on and depend vertically from said blocks. Two adjacent panels define a pocket. The panels 104 are formed of elastically-deformable non-scarifying material such as nylon composition heavy belting and extend downwardly from the turret so as to sweep across the conveyor 2, and extend outwardly into wiping contact with a fixed plate 105 (FIGURE 4) of bearing material such as nylon, forming a back wall for the testing area.

Means are provided for rotating the turret in timed relation to the travel of the bottles through the test area, whereby the panels 104 cooperate with the nylon plate 105 and the muffler head 57 to isolate and confine the bottles at the times when an explosion may occur. For this purpose, a sprocket 106 (FIGURES 2 and 5) is mounted on the power shaft 12 and connected by a chain 107 to a sprocket 108 mounted on a horizontal shaft 109 which rotates the vertical turret shaft 101 by a worm gear connection 111 (FIGURE 3). Timing adjustment of the turret 100 is secured by manual adjustment of link mechanism indicated generally by numeral 112, controlling the position of the movably mounted idler sprocket 113, the slack in the chain 107 being taken up by a spring-loaded idler sprocket 114.

Means are provided for de-energizing the motor 11 in case of obstruction or overload of any of the operating mechanism driven by the chains 14 and 107. This is accomplished by providing a yielding anchorage for the chain-manipulating timing adjustment mechanism, and arranging to open the power circuit to the motor in response to abnormal chain tension.

As shown in FIGURE 2, a sleeve member 115, slidably journalled in a stationary bearing member 116, has a switch operated disc 117, fixedly mounted on one end, and an operating knob 118 on the other. A compression spring 119 on said sleeve, located between said knob and a thrust collar loosely mounted on the sleeve, normally holds the sleeve extended with the disc 117 in contact with the bearing member 116. The sleeve 115 is internally threaded for a portion of its length, and a rod 122 is threaded into the sleeve, and held in adjusted position by a jam nut 123.

A hollow shaft 124 is internally threaded at one end to adjustably receive the threaded rod 122, and at its other end is rigidly connected to a bearing member 125 journalled on the axle 126 of the sprocket 113. Axle 128 is supported at the free end of a pivotably mounted arm 128. Rotation of the rod 122 in said shaft by means of the knob 118 adjusts the position of said sprocket, and consequently the timed relation between the driving sprocket 106 and the driven sprocket 108 of the turret drive.

A switch member 127 is mounted adjacent the bearing member 116 in such position that its trigger member is engaged by the disc 117 when the latter is drawn away from said bearing member by abnormal tension on the driving chain 107. Suitable conventional means are provided whereby such actuation of said switch causes the driving motor 11 to be de-energized.

As shown, similar means are provided for stopping the motor 11 in case of overload of the driving connection to the worm shaft 3.

In operation, the bottles 4 to be tested are brought by the conveyor 2 into engagement with the worm shaft 3 which spaces them and delivers them to the test area in timed relation with the operating mechanism for the turret 100 and the plunger assembly 6. Each bottle is thus received in a pocket of the turret, and brought by the conveyor 2 into position beneath the plunger assembly 6 as it descends. When the nozzle assembly 57 of the plunger assembly 6 makes contact with the neck of the bottle, the downward movement of the pressure pipe 34 is arrested, but the tubular shaft 27 continues to be moved down by the action of the roller 33 on the yoke 31, compressing the spring 54 to make sealing contact of the pad 66 with the neck of the bottle, and permitting the sleeve valve member 38 to move down till it seats on the stop collar 52 as shown in FIGURE 9. The ports 50 in the pressure pipe 34 are thus uncovered, and compressed air from the test source 45 is conducted into the bottle 4.

If the bottle 4 is sound, the test pressure at the nozzle assembly 57 is conducted by the tubing 83 and 85 to the pressure switch 86 to open its contacts. When the interrogate switch 88 is closed by the interrogate cam 89, solenoid 97 is not energized since switch 86 is open. Hence, the bottle 4 proceeds on the conveyor 2 to the next operation.

If, however, the bottle is defective either by reason of structural weakness causing the pressure to fracture the bottle, or through malformation which allows leakage or prevents sealing contact with the nozzle, the air pressure is not retained by the bottle, thus allowing the pressure switch 86 to remain closed. The closure of the interrogate switch 88 by its cam 89 then completes the circuit through solenoid 97 which withdraws latch 95 and permits the eject cam 91 to rotate with the power shaft 12.

When sufficient time has elapsed for the remains of the bottle to emerge from the turret beyond the test area, the lobe of the eject cam 91 engages and closes the ejector switch 98, causing actuation of the ejector 99 to push the cullet from the conveyor 2 into a receptacle. When the device is in operation, the turret 100 is enclosed in a drum-shaped housing since bottle 4 is confined within a pocket in the turret 100 at the time any explosion occurs, the glass fragments do not scatter and present a safety hazard.

I claim:

1. A device for pressure-testing frangible containers in continuous traversal including a straight conveyor, means including the conveyor for conveying and feeding the containers one at a time at constant speed through a testing area, cyclically operated nozzle means for subjecting the containers at said area to a predetermined internal pressure while the containers are on said conveyor, movable means for physically isolating each container on said conveyor as it passes through the testing area, said isolating means being synchronized with the movement of said feeding means and said nozzle means, and means responsive to failure of a container to retain and withstand the test pressure, for removing the remnants of the defective container from the conveying means.

2. A device as set forth in claim 1 in which the means for isolating the container under test comprises a turret having a plurality of angularly spaced wall members arranged to partition off each container as it traverses the test area, and means for rotating said turret in timed relation with the feeding means for the container.

3. A device as set forth in claim 2 in which the means for isolating the containers under test includes a stationary guard wall on the opposite side of the test area from said turret, the wall members on the turret being elastically deformable and extending radially from the turret to make wiping contact with the stationary wall and thus form moving pockets confining the containers under test.

4. A device as set forth in claim 3 in which the turret comprises a horizontal circular plate from which said elastically deformable wall members are dependant, and the means for pressurizing the container comprises a vertically reciprocable plunger having a nozzle formed to make sealing contact with the container, the turret plate having peripheral recesses to permit the plunger nozzle to engage the container, and said plunger has a muffling collar surrounding the nozzle and forming a guard preventing upward projection of pieces of any defective container exploded by the test pressure.

5. A device as set forth in claim 4 including means for actuating the plunger and the turret in timed relation to the movement of the container through the test area, and means for de-energizing said actuating means responsive to abnormal resistance to its operation.

6. A device as set forth in claim 1 in which the means for pressurizing the container comprises a calibrated source of fluid pressure, a vertically reciprocable tubular telescopic plunger connected to said source having a nozzle formed to make sealing contact with the container, means actuating the plunger to yieldingly press the nozzle on the container, and valve mechanism actuated by telescoping movement of the plunger after the nozzle has engaged the container, for admitting pressure from said source to said nozzle.

7. A device as set forth in claim 6 in which the ejecting means comprises an electrically controlled ejector, means including a pressure-controlled switch for causing actuation of the ejector, and means for conducting pressure from the plunger nozzle to said switch to prevent the actuation of the ejector.

8. A device as set forth in claim 7 including a normally open interrogate switch in series with the pressure-controlled switch, and means for closing the interrogate switch when the container reaches its pressurized position.

9. A device as set forth in claim 8 in which the means for causing actuation of the ejector includes an ejector switch, mechanical means for closing the ejector switch, a latch for restraining said mechanical means, and an electro-magnet in series with the pressure switch for releasing the latch when both the pressure and interrogate switches are closed.

10. A device as set forth in claim 9 in which the means for closing the ejector switch is arranged to effect such closure a predetermined time after release of said latch.

References Cited

UNITED STATES PATENTS 2,314,310   3/1943   Jackson _____ 73—37
3,389,788   6/1968   Mencacci _____ 209—111.5

M. HENSON WOOD, JR., Primary Examiner

R. A. SCHACHER, Assistant Examiner

U.S. Cl. X.R.

73—37